Figure 1:
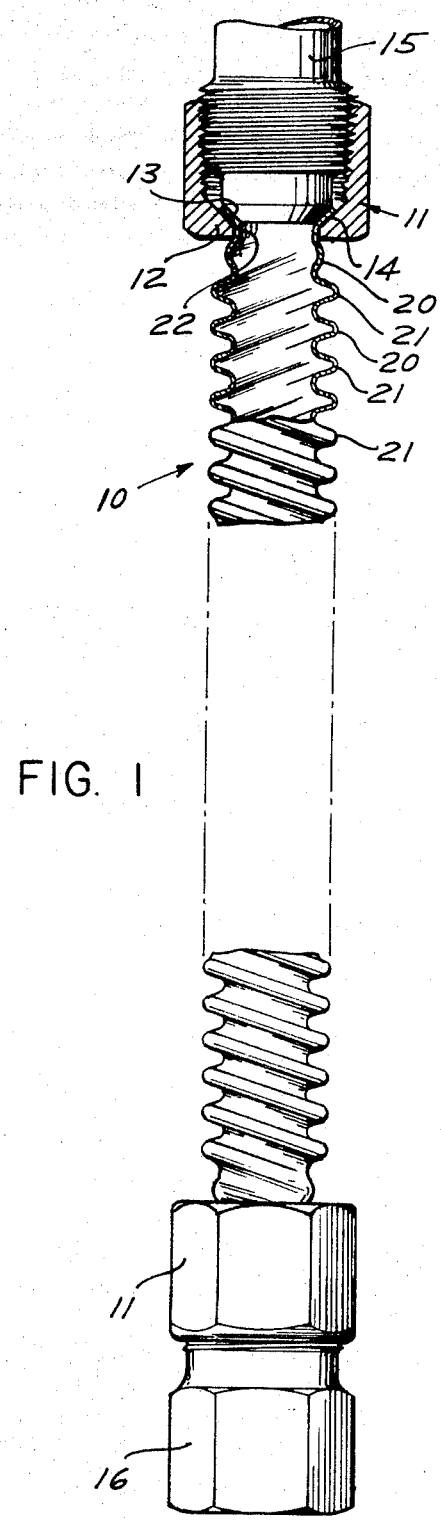

United States Patent [19]
Longfellow

[11] 3,743,328
[45] July 3, 1973

[54] GAS APPLIANCE CONNECTOR

[76] Inventor: Earl Longfellow, 9 Churchill Road, Marblehead, Mass. 01945

[22] Filed: July 26, 1971

[21] Appl. No.: 166,027

[52] U.S. Cl............ 285/226, 138/122, 285/DIG. 4
[51] Int. Cl............................................. F16l 51/02
[58] Field of Search................. 285/226, 227, 228, 285/DIG. 4; 138/38, 122, 137

[56] References Cited
UNITED STATES PATENTS

| | | | |
|---|---|---|---|
| 3,612,175 | 10/1971 | Ford | 138/38 |
| 3,273,916 | 9/1966 | Tillery | 285/226 |
| 3,135,296 | 6/1964 | Kelstrom et al. | 138/122 |
| 862,919 | 8/1907 | Isaacs et al. | 138/38 X |
| 770,599 | 9/1904 | Monteagle | 138/38 |
| 85,149 | 12/1868 | Van Amringe | 138/38 |

FOREIGN PATENTS OR APPLICATIONS

| | | | |
|---|---|---|---|
| 913,883 | 12/1962 | Great Britain | 138/122 |
| 6,521 | 3/1914 | Great Britain | 138/122 |

*Primary Examiner*—Thomas F. Callaghan
*Attorney*—Sylvester J. Liddy et al.

[57] ABSTRACT

The flexible metal tubing forming the connector has a wall thickness of from 0.020 inch to 0.064 inch and is corrugated by two helical corrugations, the coils of which are in alternate arrangement.

1 Claim, 3 Drawing Figures

PATENTED JUL 3 1973

3,743,328

INVENTOR.
EARL LONGFELLOW
BY

GAS APPLIANCE CONNECTOR

THE INVENTION

This invention relates to flexible corrugated metallic tubes of the type used as gas appliance connectors and has for its primary purpose the provision of an improved connector that is superior to those now employed for such purpose.

In view of the hazards attendant on the use of flexible corrugated metallic tubes for connecting gas appliances to gas piping in the home, the United States of America Standards Institute in this country and the Interprovincial Gas Advisory Council in Canada have set up certain basic requirements of safety, substantiality and durability that these connectors must satisfy before they will be permitted to be sold to the public of these countries. For example, among other things, connectors of this type must withstand, without bursting or leakage, a hydrostatic pressure of 250 pounds per square inch, and a 2 foot length of connector should be able to withstand 30 applications of 180° bends in two directions without leakage or damage to the tubing or fittings, and should be able to withstand, without leakage or damage to the tubing or fittings, 20 applications of 90° twist in alternate directions. This last test, usually called the "torsion test," is considered by the art to give a basic indication of the good manufacture and quality of these connectors and is the test that most connectors of poor quality are likely to fail.

A further requirement is that the tubing shall be constructed of metal of uniform thickness (commercial tolerances allowed) but no section of such tubing shall be less than 0.010 inch in thickness. A tubing made of metal in this area of thickness is quite flexible and generally meets the aforesaid bending and torsion tests. In a field where the competition is intense the use of such a tubing enables manufacturers of these connectors to manufacture the majority of flexible gas connectors with tubing of a thickness close to the minimum required to reduce their costs to a minimum. Many of these light tubings, while they tend to satisfy the required specifications, have been found not to be substantial or durable enough to give satisfactory service in all instances and some have failed. Because of this, the aforesaid controlling institutions are considering increasing their listing requirements or standards on flexible gas appliance connectors. Since any tightening of the standards by these institutions may result in a restriction to only certain types of connectors with consequent substantially increased costs to many manufacturers, the art for some time has been seeking a connector that will have the desired substantialness and durability in service and yet will not be too costly to manufacture.

The obvious solution to the problem would be to increase the thickness of the tubing used in these connectors to the extent whence they will not fail in service. This has been tried and it has been found that corrugated connectors made in the usual manner from tubing more than 0.020 inches thick cannot meet the present required specifications. In the first place they are too stiff to pass the bending test or to give satisfactory service in the uses for which they were intended. Corrugated connectors made of increased thickness tubing in the usual manner have consistently failed in the torsion test so that the art has come to the belief that a connector made of a single wall thickened tubing could not be made satisfactorily. There was also the factor that none of the manufacturers believed such a connector could be made with their present equipment. In its efforts to find a solution to the problem, the art also tried making a connector using a double wall tubing composed of two thin walls. This type of connector in certain constructions has proved satisfactory when the corrugations and thickness of the walls are carefully controlled, but it is more expensive to make than the single wall tube, and if the walls are made of such thicknesses that the composite thickness of the tube is over 0.020 inches, the double-wall tube becomes in part subject to the same objections as the above single wall tube of such thickness when made in the usual way. Further, when made in the conventional way in such increased thickness, the double wall connector assumes further disadvantages which are not present in the single wall connector of the same thickness.

I have found that the problem can be solved and flexible gas appliance connectors made that will meet all of the stringent tests for certification of listing by the authorities from tubing of a thickness greater than 0.020 inches by corrugating such tubing in a unique manner.

Figure 2:
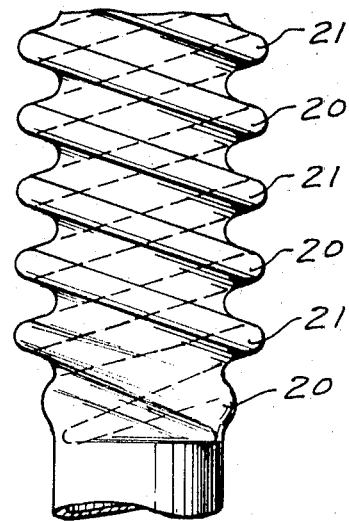
Figure 3:
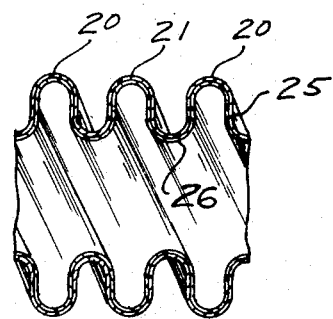

For a better understanding of my improvement, reference is made to the following description and to the accompanying drawings, in which similar reference numerals have been applied to like parts and in which FIG. 1 is an elevational view partly in section of a flexible gas appliance connector embodying the invention;

FIG. 2 is an enlarged partial end view of a tubing corrugated in accordance with the invention before being provided with the coupling members; and FIG. 3 is an enlarged, partial sectional view of a modified tubing embodying the invention.

In FIG. 1 of the drawings, the reference numeral 10 indicates generally the flexible metallic corrugated tube of the connector. On each end of the tube is a steel coupling nut 11 having an internal flange 12 provided with an internal sloping shoulder 13 on which is seated the flared end 14 of the tube 10. Each nut 11 is internally threaded at the outer end thereof and is thus adapted to be connected to a supply or fixture nipple 15, or to a coupling member 16 as indicated in FIG. 1.

In accordance with the invention, the corrugated tubing 10 is made from a plain tube of suitable diameter that is mechanically worked to provide it with two helical corrugations 20 and 21, the coils of which are alternately arranged as is shown more clearly in FIG. 2 of the drawings. The coils of each corrugation 20 and 21 are of the same conformation as the coils of the other corrugation, and have, for example, a pitch of about one to the half inch in a corrugated tubing of seven-eighths inch outside diameter. The ends of the section of tubing forming the connection are mechanically worked to form smooth walled end sections 22 of substantially reduced diameter. The outer end portions of the end sections 22 are spun to form the flared ends 14 after the coupling nuts 11 have been mounted on such end portions of the double pitched corrugated tubing.

The tubing 10 may be made of a single layer of aluminum, brass or stainless steel, as is shown in FIG. 1 of the drawings, or may be made of two layers 25, 26 as is shown in FIG. 3 of the drawings. The two layers 25, 26 in the embodiment may both be made of aluminum or brass or stainless steel, but it is preferred that the inner layer 26 be made of aluminum as such construction provides better sealing characteristics and the aluminum of such inner layer can be spun out with the aluminum, brass or stainless steel in the outer layer of the tubing forming a back-up in the formation of the end flares 14.

The thickness of the tubing wall whether made of a single layer as shown in FIG. 1, or of a double layer as shown in FIG. 3, in order to accomplish the purpose of the invention should be, I have found, within the range of from 0.020 inch to 0.064 inch. I have found that when tubing within such range of thickness is made with a single pitch corrugation it cannot pass the tests required for certification, but when provided with a double pitch corrugation in accordance with my invention, it can successfully pass such tests. This was demonstrated by taking four tubings each of 0.032 inch thick and forming two with a single pitch corrugation, and the other two with a double pitch corrugation. The single pitch corrugated tubes were too stiff for satisfactory use as a flexible connector, whereas the double pitch corrugated tubes had a greater flexibility than the single pitch corrugated tubes and readily passed the required bending test. All tubes were subjected to the torsion test under exactly the same conditions and the two single pitch corrugated tubes could not pass such tests, but developed breaks during the tests which rendered them useless. The two double pitch corrugated tubes successfully passed the requirements of the torsion test without damage to the tubings. The torsion test was then continued on the double pitch corrugated tubings beyond the required twenty applications required for specification and it was found that such tubings did not suffer damage until subject to 30 applications of such test, thus indicating that they were over 50 percent more durable than the single pitch corrugated tubing. Tests were then run with tubings made of two layers each 0.032 inch thick, so that the tubes were 0.064 inches in minimum thickness. These extremely thick tubings also passed the tests required for specification.

It is believed that the reason the thick walled double pitch corrugated tubes are able to successfully pass the tests required for specification, is that the double pitch corrugations distribute the stresses to which the tubes were subjected over a substantially bigger area than is possible with a single pitch corrugation. This is believed evidenced by the fact that when both the single and double corrugated tubes were tested to failure in the twist tests, the single pitch corrugated tubes failed by a break at one place between the corrugations of such single pitch corrugations, whereas the double pitch corrugated tubes failed by more than one crack in the tube walls at spaced apart places. In usage these double pitch corrugated thick wall tubes will be more durable and dependable and therefore safer than the connectors now being supplied to the consumer because of the greater protection afforded by their thicker walls and by the provision of the additional metal at the flared sections 14 which provides a stronger and better seal at the gas supply connection and at the appliance.

I claim:

1. A flexible gas appliance connector capable of passing the official bending and torsion tests required for certification as a gas appliance connector and comprising a flexible metallic tubing having a coupling member mounted on each end thereof, said tubing including a central spiral grooved corrugated section and end portions on which are mounted the coupling members, the corrugations in said central section being constituted of outwardly projecting ridge portions having rounded crests and steep sides connected by rounded groove portion bottoms, and said end portions each having a diameter corresponding approximately to the diameter of said rounded bottoms, said tubing being characterized in that it has a wall thickness between 0.02 inch and 0.064 inch, and in that said ridge portions of said central section thereof are formed by two substantially similar helical corrugations distributing bending and torsion stresses on the tubing over a greater area than is possible with a tubing of the same wall thickness having a single corrugation, the coils of said corrugations being alternately arranged throughout the length of the two pitch corrugation and the steep sides of which are connected at their lower ends by said rounded bottoms, the ridge and groove portions formed by the two helical corrugations being of substantially equal widths so that the wall of said tubing in longitudinal section is sinuously shaped.

* * * * *